(12) United States Patent
Canto Michelotti

(10) Patent No.: US 9,605,743 B2
(45) Date of Patent: Mar. 28, 2017

(54) DECOUPLER WITH FREE WHEEL SYSTEM AND VIBRATION DAMPING AND ONE-WAY CLUTCH WITH FREE WHEEL SYSTEM

(71) Applicant: ZEN S/A INDUSTRIA METALURGICA, Brusque SC (BR)

(72) Inventor: Alvaro Canto Michelotti, Brusque SC (BR)

(73) Assignee: ZEN S/A INDUSTRIA METALURGICA, Brusque, SC (BR)

( * ) Notice: Subject to any disclaimer, the term of this patent is extended or adjusted under 35 U.S.C. 154(b) by 393 days.

(21) Appl. No.: 14/238,787

(22) PCT Filed: Sep. 9, 2013

(86) PCT No.: PCT/BR2013/000349
§ 371 (c)(1),
(2) Date: Feb. 13, 2014

(87) PCT Pub. No.: WO2014/036625
PCT Pub. Date: Mar. 13, 2014

(65) Prior Publication Data
US 2015/0285365 A1    Oct. 8, 2015

(30) Foreign Application Priority Data
Sep. 10, 2012  (BR) .......................... 1020120022803

(51) Int. Cl.
*F16H 55/36*  (2006.01)
*F16D 41/20*  (2006.01)

(52) U.S. Cl.
CPC ........... *F16H 55/36* (2013.01); *F16D 41/206* (2013.01); *F16H 2055/366* (2013.01)

(58) Field of Classification Search
CPC ... F16H 55/36; F16H 2055/366; F16D 41/206
See application file for complete search history.

(56) References Cited

U.S. PATENT DOCUMENTS 6,394,247 B1 *  5/2002  Monahan .............. F16D 41/206
                                                                192/41 S
7,712,592 B2 *  5/2010  Jansen ...................... F16D 3/52
                                                                192/41 S
(Continued)

FOREIGN PATENT DOCUMENTS

WO   WO 2011/160208   * 12/2011
WO   WO 2012/061930     5/2012
WO   WO 2012/061936     5/2012

*Primary Examiner* — William E Dondero
*Assistant Examiner* — Mark K Buse
(74) *Attorney, Agent, or Firm* — Sheridan Ross P.C.

(57) ABSTRACT

The present invention relates to a decoupler with free wheel system and comprising a vibration damping pulley, a shaft actionable by the pulley, hub pieces having a first hub piece and a second hub piece, hub pieces being mounted between the inner race of the pulley and the outer surface of the shaft, at least one journal element between the shaft and pulley, along with a torsion spring, and a clutch spring, with the first hub piece being mounted on the shaft and the second hub piece being mounted around the shaft and can rotate relative to it, the torsion spring being disposed between the outer race of the huh pieces and the inner race of pulley, having a first end operatively attachable to the pulley and a second end operatively attachable to the second hub piece and the clutch spring being disposed internally in relation to the torsion spring and which is frictionally engaged with the hub pieces for transmission of torque to the shaft.

14 Claims, 7 Drawing Sheets

(56) References Cited

U.S. PATENT DOCUMENTS

Figure 1A:
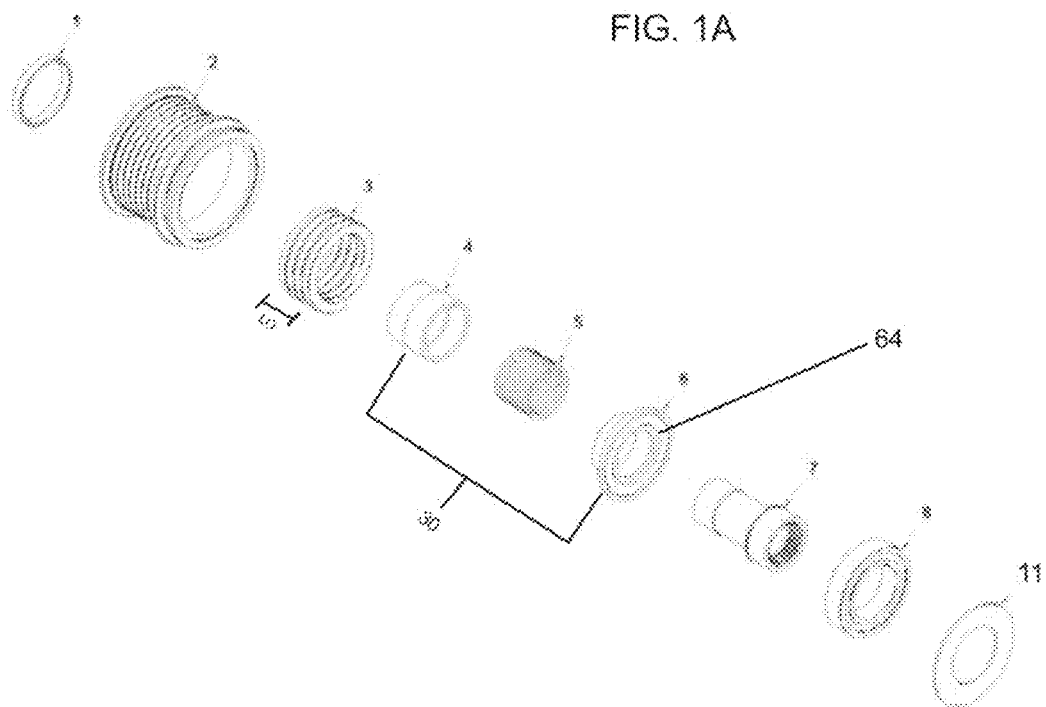

| | | | | |
|---|---|---|---|---|
| 2003/0051960 A1* | 3/2003 | Li | ............................ | F16D 7/027 192/28 |
| 2010/0009796 A1* | 1/2010 | Fitz | ......................... | F16H 55/36 474/197 |
| 2013/0087428 A1* | 4/2013 | Antchak | ................. | F02B 67/06 192/41 S |

* cited by examiner

DECOUPLER WITH FREE WHEEL SYSTEM AND VIBRATION DAMPING AND ONE-WAY CLUTCH WITH FREE WHEEL SYSTEM

CROSS REFERENCE TO RELATED APPLICATIONS

This application is a national stage application under 35 U.S.C. 371 of PCT Application No. PCT/BR2013/000349 having an international filing date of 9 Sep. 2013, which designated the United States, which PCT application claimed the benefit of Brazil Application No. BR102012022803-3 filed 10 Sep. 2012, the entire disclosure of each of which is incorporated herein by reference.

The present invention relates to a decoupler system with free wheel operation and a vibration damping mechanism that can be applied to mechanical connections, such as alternators in vehicles. The decoupler mechanism according to the invention has a fail-safe system and can also be configured to operate as a one-way clutch in a simple way.

DESCRIPTION OF PRIOR ART

Overrunning alternator decouplers (OADs) with a free wheel system are used in some types of drive connections such as electrical alternators in automotive vehicles, among others, to enable the transmission of power from a drive shaft to a driven shaft, so that the driven shaft can rotate at a faster speed than the drive shaft or in a different direction of rotation. In these situations, the decoupler allows overrunning between the driving shaft and the driven shaft, providing a free wheel system which allows the two shafts to rotate independently of each other. Furthermore, the decoupler also allows to change the natural resonance frequency of the accessory belt system of an internal combustion engine, reducing noise and vibration of the system as a whole and increasing the useful life of some critical components such as the belt tensioner.

In some torque transmission couplings using a pulley driven by a belt to transmit torque to a shaft, a clutch spring or wrap spring is disposed inside the pulley, in direct contact with the pulley inner race. The axle hub or the driven shaft is arranged internally to the clutch spring, so that the clutch spring performs the torque transmission function. In any event, a friction contact between the clutch spring and the inner surface of the pulley is required so that the driving shaft is coupled to the driven shaft. This friction involves high levels of compression and may cause great wear on the components of the clutch, and in particular on the pulley. To support the high stress levels and to provide acceptable durability of the system, the pulley, and especially its inner race, must be made of a very resistant material, such as steel, and has to be preferably submitted to a heat treatment to increase its strength. These requirements increase the weight and cost of the decoupler, and require more complex production processes.

In addition, the decoupler mechanism should comprise a torsion spring or other equivalent means which can substantially alter the natural resonant frequency (as previously mentioned), and thus ensure improved power transmission performance. Typically, this spring is disposed inside the clutch spring, between it and the shaft or axle hub. To provide the vibrational damping effect, the torsion spring need not exert a contact friction with the other components of the decoupler. However, the larger is the spring, the greater is its strength for the required level of torque for the application. However, the dimensions of the torsion spring are limited by the reduced internal space of the clutch spring.

The document WO2012061936, for example, describes a decoupler which is positionable between an axis (for example, for an alternator shaft), and a power transmission element (for example, an accessory drive belt) on an engine. The decoupler includes a axle hub that is mounted in the pulley, engaging the power transmission member and a spring that provides isolation between the hub and the shaft. The decoupler provides damping at a preset value between the hub and the pulley. This document shows the clutch spring in contact with the track on the inside surface of the pulley to provide frictional engagement, and the torsion spring disposed internally to the spring clutch, providing vibration damping.

The document WO2012061930, for example, refers to a decoupler assembly for use between an axis and an element used to drive the shaft. The decoupler includes a pulley, a hub and a coil torsion spring. The two ends of the spring are engageable, at least indirectly, to the pulley and the hub for the transfer of torque therebetween. At least one end of the spring engages an engagement structure (on either the pulley or the hub) that includes a helical axial shoulder and a driver wall. The spring transfers torque in one direction through the driver wall (for example, when the pulley rotates faster than the hub), but the end of the spring is not fixedly attached to the driver wall. This invention does not allow simultaneous freewheel and anti-vibration damping, nor can any other invention be found in the state of the art showing these two features together, while also using a pulley body of lightweight material.

Another drawback found in the state of the art of decouplers, such as the previous documents mentioned here, is the occurrence of leakage of the grease used to lubricate the clutch spring, torsion spring and other parts, due to centrifugal force generated when the decoupler is in operation. As can be seen in the decouplers of the prior art documents cited here, the axle hub or the bearings are usually in direct contact with the inner race of the pulley, precisely in the region in which the grease is thrown by centrifugal force. This contact zone between the axle hub and pulley is not completely leakage-free. Seals may be used to reduce leakage between these parts, but the incorporation of seals means an additional component to the decoupler assembly, which increases the complexity of construction and its cost. In addition, the springs are not completely isolated within the interior of the decoupler housing, which also contributes to the leakage of grease.

In addition, there are no examples in the prior art of an OAD with a fail-safe design which would enable the decoupler to continue to operate for a period of time, in the case of failure or breakage of the torsion spring. In all examples of previous decouplers, when the torsion spring breaks, the pulley loses all function, failing to transmit torque to the driven shaft. If the application of the decoupler is on an automotive alternator, the vehicle will only operate until the battery runs out, and then the vehicle will stop completely due to battery discharge because the alternator is no longer providing electrical energy. Fail-safe mechanisms would allow the decoupler to continue to operate as if it was a rigid pulley, at least for a period of time, until the damaged pulley can be replaced.

Finally, the decoupler with an integral free wheel system can operate as freewheel system only, such as one-way clutches (one-way clutch—OWC) without a vibration absorber system by means of a simple system adaptation,

OBJECTIVES OF THE INVENTION

A first object of the invention is to provide a decoupler that performs both free wheel and vibration damping functions, and, in which the pulley can be made of lower strength materials, without surface treatments, with low cost and good durability.

Another objective of the invention is to provide a decoupler with a torsion spring of a larger diameter, thereby providing higher torque capacity in the same space available to the system, thereby minimizing the potential failure of breakage of the torsion spring if overloaded. This advantage allows the higher torque on the torsion spring without the use of additional components which limit the torque and decrease the tension on the torsion spring.

Another objective of the invention is to provide a decoupler endowed with simple construction that is waterproof and can reduce grease leakage due to centrifugal force.

It is also the object of the invention to provide a decoupler with a fail-safe mechanism, which allows the assembly to continue to operate, ensuring that the torque continues to be transmitted, even in case of failure or breakage of the torsion spring or clutch spring.

Finally, it is an object of the invention to provide a decoupler that can operate as a decoupled OAD as well as a unidirectional clutch, from simple modifications to the construction of the assembly.

SHORT DESCRIPTION OF THE INVENTION

The objectives of the invention are achieved by a decoupler with free wheel system and vibration dampening comprising: a pulley, a shaft actionable by the pulley, a axle hub having a first hub piece and a second hub piece, the hub being coupled between the inner race of the pulley and the outer surface of the shaft, at least one journal element between the shaft and pulley, a torsion spring, a clutch spring, wherein the first hub piece is coupled in a torsion proof manner on the shaft and the second hub piece is mounted around the shaft and can rotate relative to it, the torsion spring is arranged between the outer race of the hub and the inner race of the pulley having a first end operatively couplable to the pulley and a second end operatively couplable to the second hub piece, and the clutch spring is arranged internally in relation to the torsion spring and is frictionally couplable to the hub for transmission of torque to the shaft.

In one embodiment, the second hub piece may have a radial wall extending radially to the inner race of the pulley, and the first and second hub pieces are disposed with a gap between them.

The clutch spring may be disposed between the external surface of the shaft and the inner surfaces of the axle hub, being frictionally engaged with the inner surfaces of the hub pieces, or between the outer surface of the axle hub and the inner surface of the torsion spring, being frictionally engaged with the outer surfaces of the axle hub.

Preferably, the shaft have a first ending region, which fits a portion of smaller inner diameter of the first hub piece, a second ending region, which interference fits a bearing element, and a center region with a smaller outer diameter than the first and the second shaft ending regions.

Preferably, at least one bearing element is mounted between the pulley and the first axle hub piece. At least one bearing element is mounted between the pulley and the shaft, allowing relative rotational movement between the pulley and the shaft. The bearing element can comprise at least one of a roller bearing, a bearing bushing and a bearing ring.

The pulley inner race may comprise a stopper, which fits to the torsion spring first ending and the pulley outer race may comprise a stopper, which fits to the torsion spring second ending when the pulley is in rotational movement.

Alternatively, the pulley comprises a first portion with smaller inner diameter, which extends radially towards the axles hub, and a center portion with greater inner diameter, that makes a housing cavity side in which is set the torsion spring, this housing cavity side being closed by a grease leakage contension wall formed by the transition between the pulley smaller inner diameter and the pulley greater inner diameter, and the axially opposed side is limited by hub second piece.

Alternatively, the decoupler comprises a bearing ring mounted to the pulley inner race, and a bearing bushing mounted between the first hub piece and the bearing ring, wherein the bearing ring has a stopper that fits the torsion spring first ending when the pulley is in rotational movement, and wherein a torsion spring is set inside a housing cavity limited by the bearing ring in the axial direction and by the hub second piece.

Preferably, the housing cavity has an axial length smaller than the torsion spring axial length, so that the torsion spring disposed inside the housing exerts an axial force F1 upon the hub second piece, and the hub second piece exerts a friction force Fat at least upon the bearing element, when the hub second piece rotates relative to the pulley.

Alternatively, the hub second piece has a portion of greater inner diameter and a portion of smaller inner diameter, providing a cavity between the portion of greater inner diameter and the portion of smaller inner diameter, the hub first piece having a portion of smaller inner diameter, which interference fits on the shaft, and a portion of greater inner diameter, providing a cavity between the portion of smaller inner diameter and the portion of greater inner diameter, the cavity provided in the hub second piece being arranged in contiguity with the cavity provided in the hub first piece, and the clutch spring being set inside the cavities of the first hub and the second hub.

The first hub piece and the second hub piece have, each, an inner end with coupling means through which the two hub pieces are coupled together, one seal member is optionally (?) positioned on the gap between the first hub piece and the second hub piece.

The decoupler may comprise a washer mounted by interference fit with the shaft and extending radially to the pulley, the washer being arranged in contact with a face of the radial wall of the second hub piece, the washer has a shoulder on its face in contact with the wall, and the wall has a shoulder on its face in contact with the washer, the wall and washer are positioned so that the shoulder of the washer is angularly displaced relative to the shoulder of the wall, so that when an overload is applied to the second hub piece, the shoulder of the washer rotates and overlaps the shoulder of the wall, causing the second hub piece to move toward the first hub piece and the first and second hub pieces are locked by interference between them. The shoulder of the washer and the shoulder of the wall each have a thickness of size equal to the clearance between the second hub piece and the first hub piece. The inner race of the pulley has a recess in the region of contact with the radial wall of the second hub piece and the washer, the recess having an internal stop which can contact the radial wall, locking the second hub piece to prevent rotation relative to the pulley only when the the shoulder overlaps the shoulder.

The pulley may be made of steel, aluminum or polymeric materials.

The objectives of the invention are also achieved by a one-way clutch with free wheel system comprising a pulley, a shaft actionable by the pulley, a hub mounted between the inner race of the pulley and the outer surface of the shaft, at least one journal element between the shaft and pulley, and a clutch spring frictionally engaged with the hub for transmission of torque to the shaft, wherein the hub pieces comprises a first hub piece coupled in a torsion proof manner to the axle and a second hub piece rotatably mounted around the shaft, and the first and second hub pieces are arranged with a gap between them, the one-way clutch further comprising a coupling means between the second hub piece and pulley, the coupling means coupling the pulley with the second hub piece with torque transmission when the pulley rotates in one direction.

The second hub piece preferably has a radial wall extending radially to the inner race of the pulley, and the inner race of the pulley has an internal stop which contacts the radial wall (64), locking the second hub piece in a rotation proof manner relative to the pulley when the pulley rotates in one direction.

The objectives of the invention are also achieved by a decoupler with free wheel system comprising a pulley, a shaft actionable by the pulley, a hub having a first hub piece and a second hub piece, the hub pieces being coupled between the inner race of the pulley and the outer surface of the shaft, at least one journal element between the shaft and pulley, and a clutch spring frictionally attachable to the hub pieces for transmission of torque to the shaft, wherein the hub comprises a first hub piece coupled in a rotation proof manner to the axle and a second hub piece which is rotationally mounted around the shaft, the second hub piece having a radial wall extending radially to the inner race of the pulley, the first and second hub pieces being arranged with a gap between them, the decoupler further comprising a stop washer mounted by interference fit to the shaft and extending radially to the pulley, the stop washer being arranged in contact with one face of the radial wall of the second hub piece, the washer has a shoulder on its face in contact with the wall, and the wall has a shoulder (101) on its face in contact with the washer, the wall and washer are mounted so that the shoulder of the washer is angularly displaced with respect to the shoulder of the wall, and when an overload is applied to the second hub piece, shoulder of washer overlaps the shoulder of washer, so that the second hub piece is shifted toward the first hub piece and the first and second hub piece are locked by interference between them.

Preferably, the washer and the shoulder of the wall having a thickness of size equal to the clearance between the second hub piece and the first hub piece. The inner race of the pulley has a recess in the region of contact with the radial wall of the second hub piece and the washer, the recess having an internal stop which can contact the radial wall, locking the second hub piece in a rotation proof manner to the pulley only when the shoulder overlaps the shoulder.

SHORT DESCRIPTION OF THE DRAWINGS

Figure 1B:
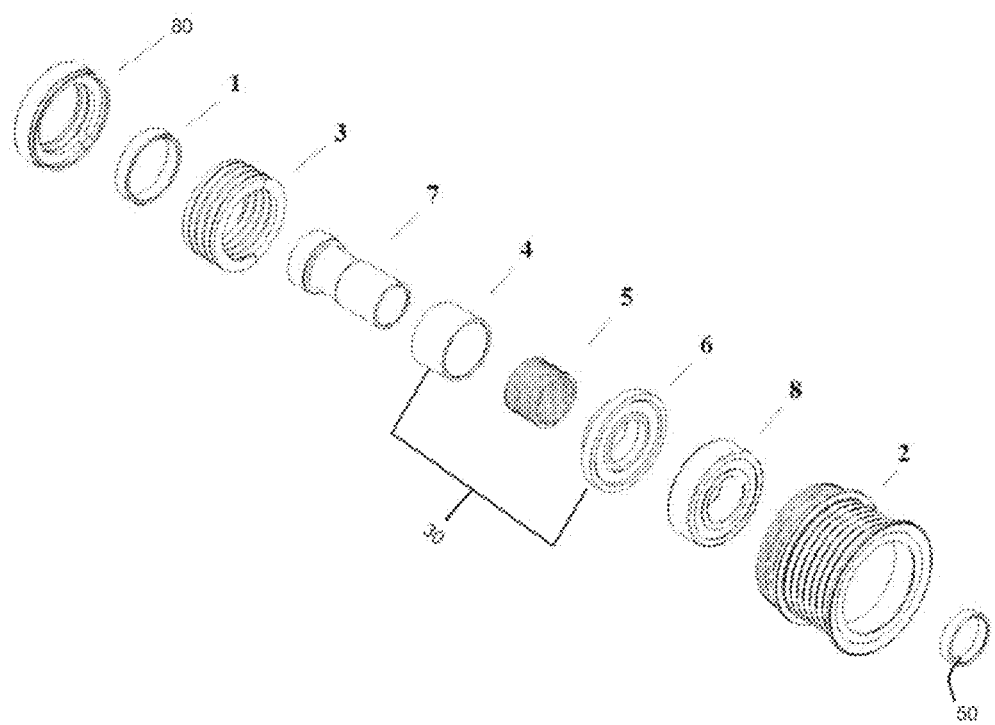
Figure 2A:
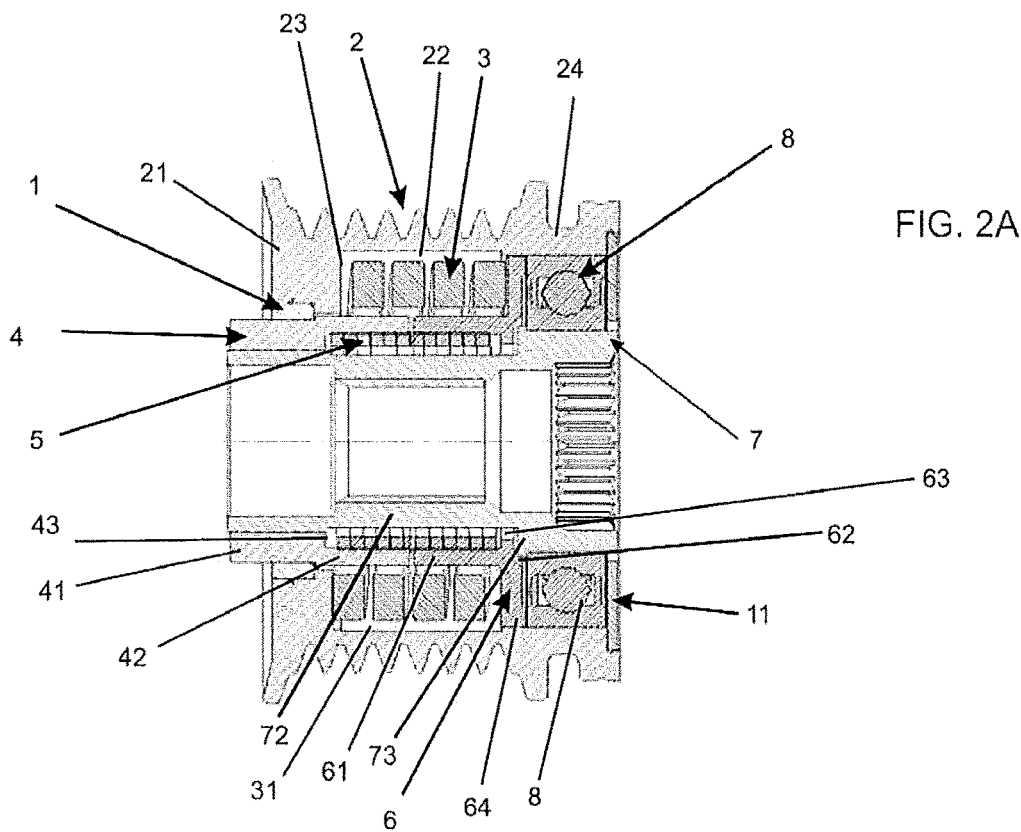
Figure 2B:
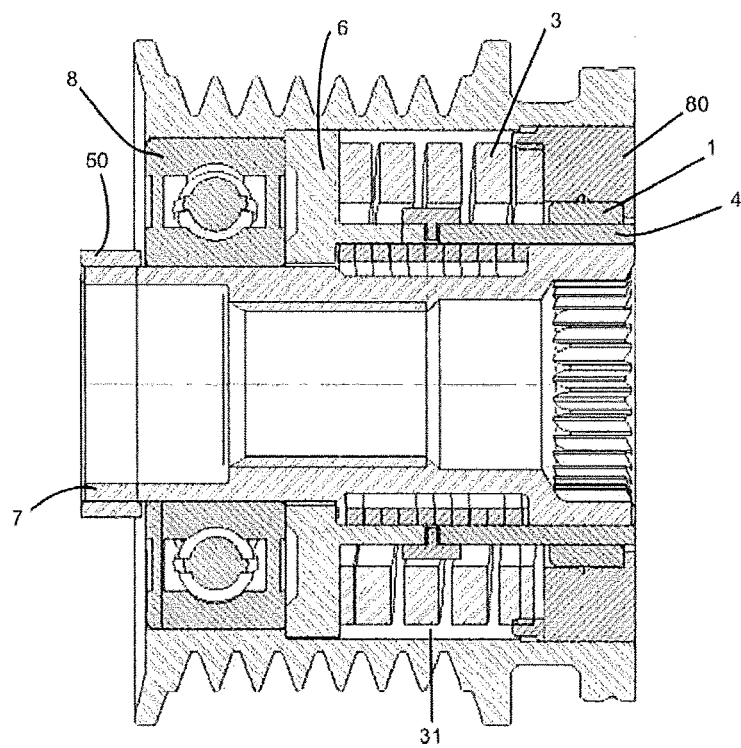
Figure 3:
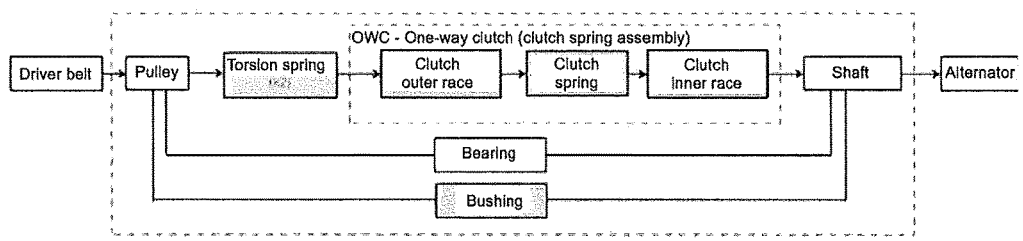
Figure 4A:
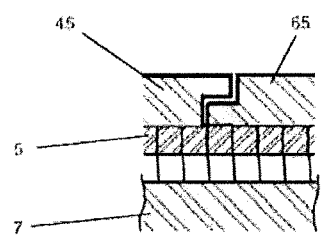
Figure 4B:
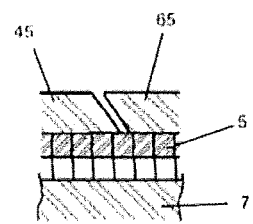
Figure 4C:
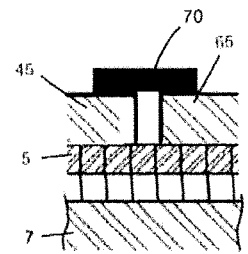
Figure 5:
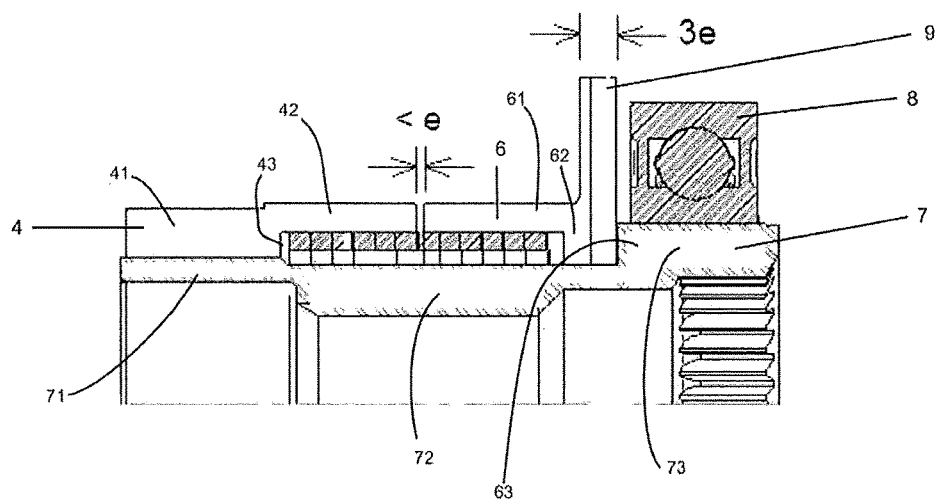
Figure 6:
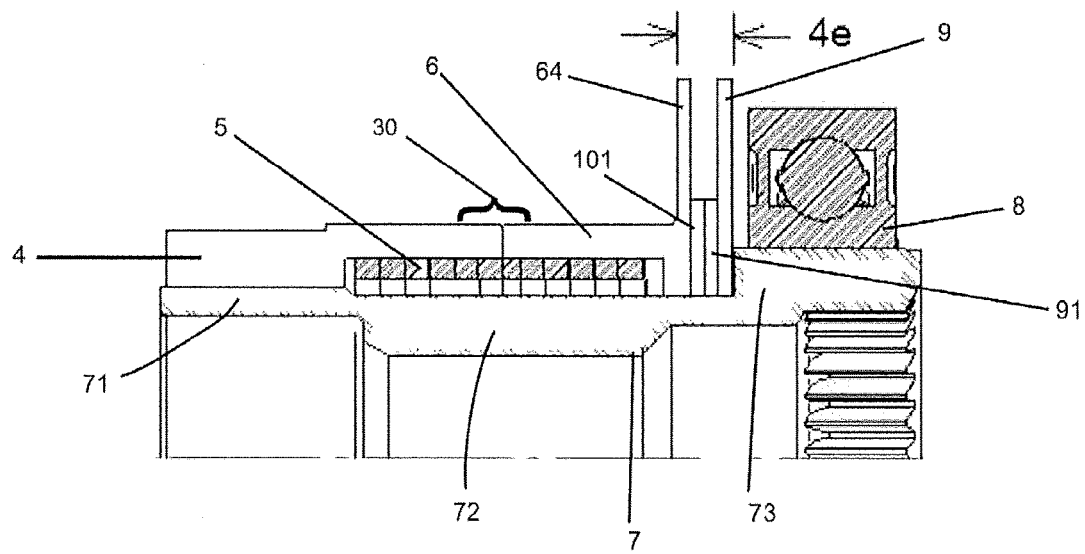
Figure 7A:
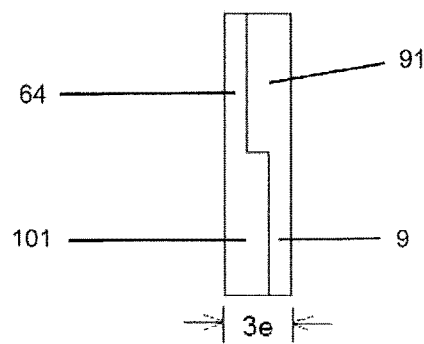
Figure 7B:
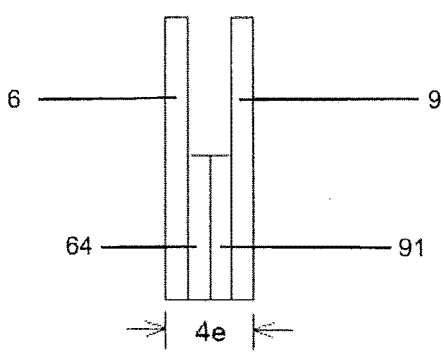
Figure 8:
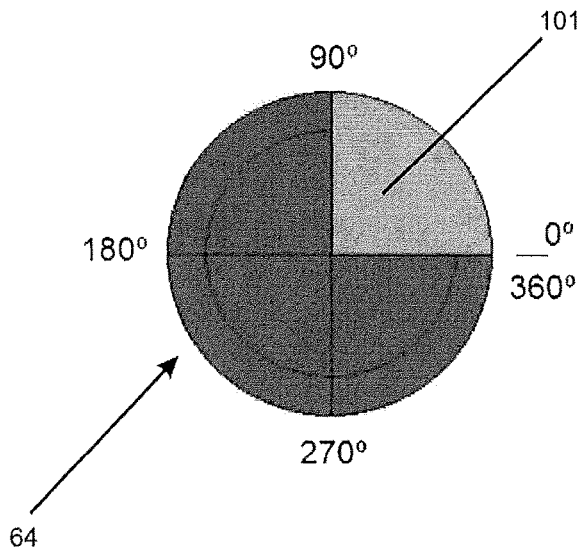
Figure 9:
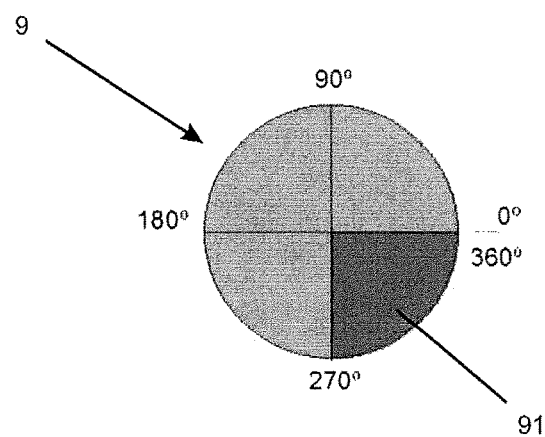
Figure 10A:
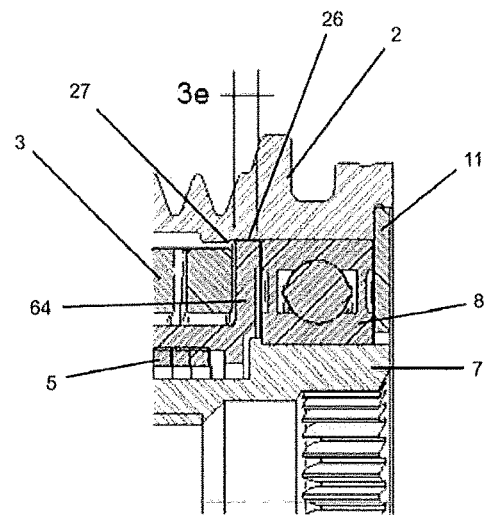
Figure 10B:
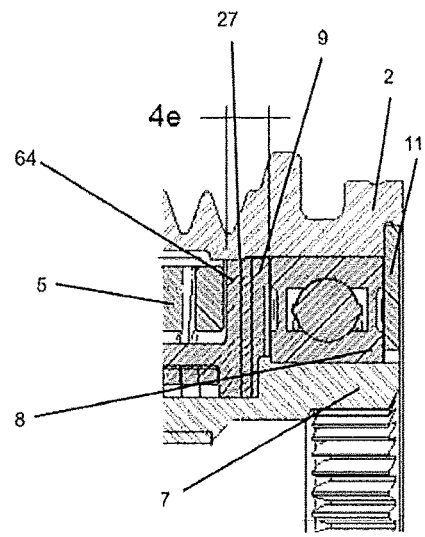
Figure 11A:
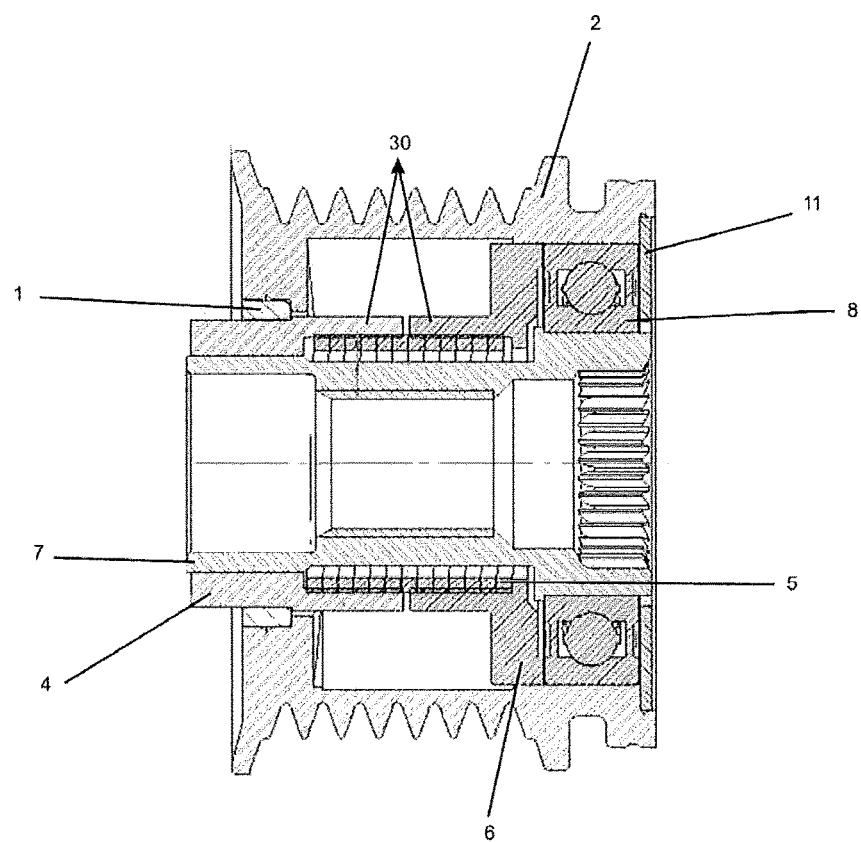

The present invention will, hereinafter, be described in more detail based on an example of execution represented in the drawings. The figures show:

FIG. 1A—is an exploded view of the components of the decoupler according to a first embodiment of the invention;

FIG. 1B—is an exploded view of the components of the decoupler according to a second embodiment of the invention;

FIG. 2A—is a cross-sectional view of the decoupler shown in FIG. 1A in an assembled state;

FIG. 2B—is a cross-sectional view of the decoupler shown in FIG. 1B in an assembled state;

FIG. 3—is a block diagram schematically showing the internal arrangement of the decoupler in accordance with the invention;

FIGS. 4A, 4B and 4C—are cross sectional views of three methods of reducing the clearance between the first and second hub components according to the invention to prevent grease leakage from inside the One-way Clutch subsystem;

FIG. 5—is a cross-sectional view of the fail-safe mechanism of the torsion spring and the clutch system of the decoupler, showing the coupling between the first hub piece, the second hub piece and the stop washer in the normal operational condition;

FIG. 6—is a cross-sectional view of the fail-safe mechanism of the torsion spring and the clutch system of the decoupler showing the coupling between the first hub piece, the second hub piece and the stop washer operating in the fail-safe mode;

FIGS. 7A and 7B—are the detailed cross sections of the coupling between the second hub piece and the stop washer in the normal and fail-safe modes, respectively;

FIG. 8—shows the wall face of the second hub piece with the hub shoulder for operation in the fail-safe mode;

FIG. 9—shows the face of the stop washer in contact with the wall of the second hub piece, for operation in the fail-safe mode;

FIGS. 10A and 10B—are the detailed cross section views of the arrangement of the second hub piece and the stop plate relative to the pulley in normal operation and fail-safe mode respectively, showing the locking between the pulley and the second hub piece; and FIG. 11A—is a cross section view of the decoupler in accordance with the embodiment of FIG. 1A showing the one-way clutch but without the torsion spring.

Figure 11B:
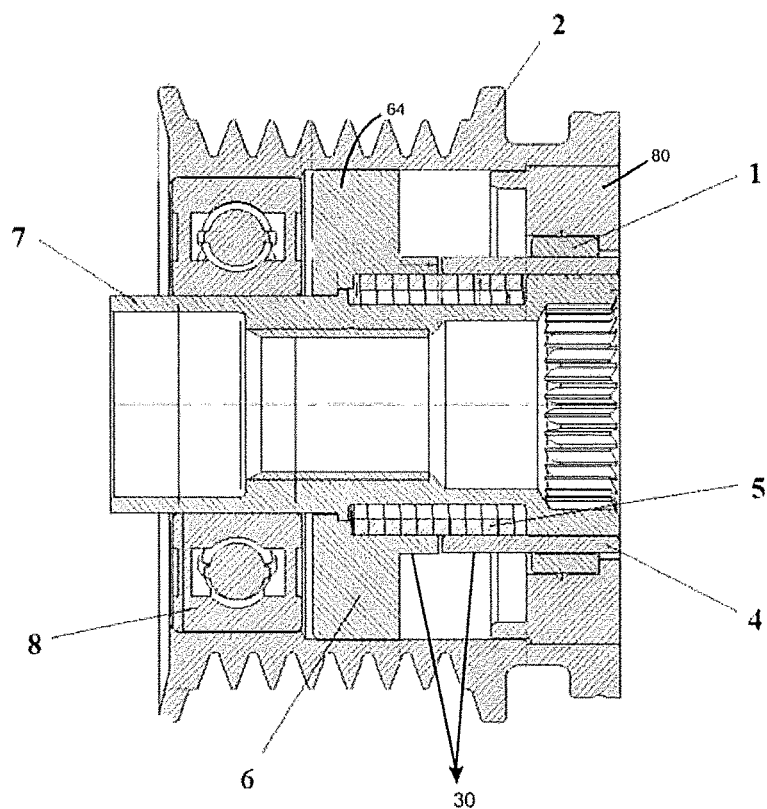

FIG. 11B—is a cross section view of the decoupler in accordance with the embodiment of FIG. 1B showing the one-way clutch but without the torsion spring.

Figure 12:
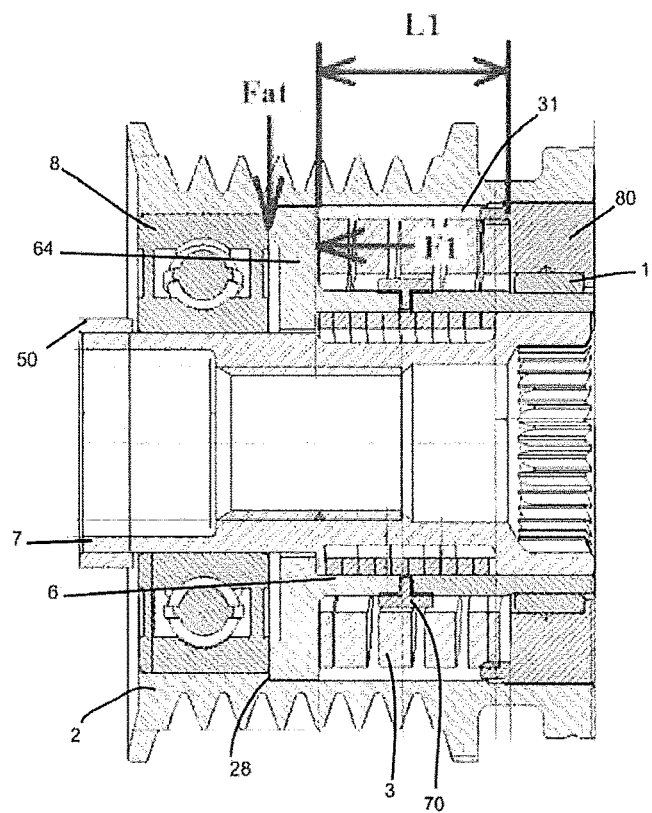

FIG. 12—is a cross section view of the decoupler in accordance with the embodiment of FIG. 1B showing forces exert by the torsion spring on the axle hub and by the axle hub on the bearing and the pulley due the fit of the torsion spring on the housing cavity.

DETAILED DESCRIPTION OF THE FIGURES

The present invention relates to a decoupler with free wheel system and vibration damping mechanism, as shown in FIGS. 1 to 11, which can be used for different types of mechanical devices such as the coupling between pulleys and alternators in automotive vehicles.

As can be seen most clearly in FIGS. 1A and 2A, the decoupler comprises a shaft 7 to be driven, an axle hub 30 disposed around a driven shaft 7, a pulley 2 arranged externally to the axle hub 30 responsible for driving the shaft, at least one mechanical element for journaling and centering between the shaft 7 and the pulley 2, a torsion spring 3 and a clutch spring 5. The torsion spring 3 is disposed between the outer race of the axle hub 30 and the inner race of the pulley 2 with a first end operatively attachable to the pulley 2 and a second end operably attachable to the axle hub 30.

The clutch spring 5 is disposed radially inward of the torsion spring 3 and is frictionally attachable to the axle hub 30 to transmit torque to the shaft 7. In the embodiment of the invention shown in the figures, the clutch spring 5 is disposed between the outer surface of the shaft 7 and the inner surfaces of the axle hub 30, so that it is frictionally attachable to the inner surfaces of the axle hub 30. However, according to another preferred embodiment of the invention not shown, the clutch spring 5 can be disposed between the outer race of the axle hub 30 and the inner surface of the torsion spring 3, so that it is frictionally attachable to the outer surfaces of the axle hub 30.

FIG. 3 shows a schematic representation of the invention illustrating the functional components of the decoupler in a block diagram form in such a way that the outermost component, the accessory drive belt, is shown to the left, and the components which are being successively coupled internally are shown toward the right, ending with the innermost element, the driven shaft, which can be coupled to an alternator. FIG. 3 clearly identifies how this invention is distinguishable from state of the art decouplers which comprise a belt-driven pulley with an internal torsion spring 3. Internal to the torsion spring is disposed a one-way clutch assembly comprising the axle hub 30 and the clutch spring, whose inner race performs the torque transmitting engagement with the driven shaft. The decoupler also has at least one journal element allowing relative rotation between the shaft 7 and the pulley 2. Preferably, this journal element is a bearing 8 and a bushing 1 disposed between the shaft and the drive pulley. The details of these parts, the layout and their engagement will be described in more detail below with references to FIGS. 1 to 11.

The pulley 2 is the component that provides the input torque that is transmitted to the shaft 7, so that the rotational motion of the pulley drives the rotation of the shaft. In a preferred embodiment of the invention, the shaft 7 is an alternator shaft driven by the pulley. The pulley 2 and the shaft 7 are rotatably coupled, however in view of the decoupler's operation, the shaft may rotate together with the pulley when both are in a coupled stated, or when in the disengaged state, the shaft may rotate at a different and greater speed than the pulley ("overrunning") or even in a different direction from the pulley. The pulley 2 has an outer surface provided with grooves for engagement of a drive belt (not shown) coupled to other components of a motor such that the belt drives the rotational movement of the pulley 2.

In a preferred embodiment of the invention which can be seen more clearly in FIG. 2A, the pulley 2 has a portion 21 with greater radial thickness and thus smaller inner diameter, which extends radially inward toward the first hub piece 4. It should be noted that the pulley still would function without this smaller diameter. A bushing 1 is positioned between the portion 21 of the pulley 2 and the outer surface of the first hub piece 4. The bushing 1 is responsible for journaling and centering between the shaft 7, the hub first piece 4 and the pulley 2, thereby allowing rotational movement between the shaft 7 and the pulley 2.

The pulley 2 also features a central portion 22 with greater diameter than the portion 21, thereby forming a side of an internal housing cavity 31, within which is disposed a torsion spring 3. The opposite side of the housing cavity 31 of the torsion spring 3 is limited in the axial direction by the second hub piece 6. In the region of transition between the smaller inner diameter of portion 21 and central portion 22 of larger inner diameter of the pulley 2, is formed a containment wall 23 which closes this side of the housing cavity 31 of the torsion spring, and performs the function of containment of leakage of grease used to lubricate the torsion spring 3. Containment of the grease is necessary due to the fact that when the decoupler is in operation, the rotation of its components generate centrifugal force which tends to push grease out the decoupler. Due to the position of the containment wall 23 forming a barrier at one end of the central portion 22 of the pulley, the grease is contained within the volume surrounding torsion spring 3.

An inner surface of the pulley 2 has a stop (not shown), which contacts the first end of the torsion spring 3 when the pulley rotates, transferring torque to the torsion spring 3. Thus, since the second end of the torsion spring 3 is operatively coupled to the second hub piece 6, the pulley 2 transmits its rotating torque to the torsion spring 3, which will, in turn, transmit this torque to the second hub piece 6, and consequently to the shaft 7, as will be explained later.

As the transmission of torque between the pulley 2 and the torsion spring 3 is by means of a stop applying torque to the first end of torsion spring 3, there is no need for friction engagement between the torsion spring and the pulley. Thus, the inner surface of the central portion 22 of the pulley 2 need not have a high hardness and strength. Consequently, the pulley need not be made of wear resistant and heavy materials, such as steel or other metals, and does not need to be subjected to surface heat treatment. Thus, the pulley can be made of lightweight and cheaper materials that may be less wear resistant such as aluminum or polymers.

As mentioned previously and as can be seen in the schematic illustration of the decoupler according to the invention in FIG. 2A, the clutch spring 5 is located between the inside of hub first and second pieces 4, 6 and shaft 7, inside the torsion spring 3, instead of being arranged next to the inner race of the pulley 2, as in the state of the art. Because of this arrangement used the decoupler according to the present invention, torsion spring 3 can be larger and the diameter is limited only by the inner race of the central portion B 22 of the pulley. Torsion springs of larger diameter more efficiently perform the function of damping the torsional vibrations of the engine and are subject to lower levels of stress for a given load, which is one of the advantages of the invention compared to the prior art.

The pulley also has a second portion 24 which has an inner diameter compatible with the diameter of the bearing 8 so as to be press fit or mounted by other suitable means, allowing relative rotational movement between the pulley 2 and the shaft 7.

The axle hub 30 of the decoupler is set between the inner race of the pulley 2 and the outer surface of the shaft 7, and inside the torsion spring 3. The axle hub 30 is provided with a first hub piece 4 and a separate second hub piece 6, being arranged with a gap between them.

The first hub piece 4 is mounted to convey torque to the shaft 7. This first hub piece 4 has a section 41 with a smaller inner diameter, which is fitted by interference or by other means appropriate to the shaft 7, and a portion 42 with larger internal diameter, forming a sort of cavity, in which is housed a portion of the clutch spring 5, which will be better described later.

The second hub piece 6 is mounted around the shall. 7 and can rotate relative to it and may include a journal element on the shaft, such as a bushing 1. This second hub piece 6, that in this embodiment is arranged in the end close to the coupling with the alternator, has a first region 61 of larger internal diameter and a second region 62 of smaller internal diameter, thereby forming a kind of cavity in which is housed a portion of the clutch spring 5 in the region of larger internal diameter 61. The hub pieces 4, 6 are arranged in such a way in the decoupler so that the cavities formed in the second hub piece 6 and the first hub piece 4 are contiguous to one another, forming a single cavity for housing the clutch spring 5. Therefore, the inner surfaces of the first hub piece 4 and the second hub piece 6, at least in their regions of larger diameter 42, 61 which house the clutch spring 5 must be made of a material with high hardness to withstand abrasive friction with clutch spring 5. Preferably these surfaces are made of heat treated steel.

Additionally, the transition zones in the regions of larger diameter 42, 61 to the regions of smaller diameter 41, 62 of the first hub piece 4 and the second huh piece 6 form containment walls 43, 63 of the cavity housing the clutch spring, and effectively contain grease leakage caused by centrifugal force, similar to that explained previously with respect to the torsion spring 3. Due to the layout of the containment walk 43, 63, grease thrown centrifugal outwards runs into these containment walls 43, 63 and is stored within the cavity containing the clutch spring 5.

Moreover, as can be seen in FIGS. 2A, 4A, 4B, and 5, the first and the second hub pieces 4, 6 are arranged within the decoupler with a small gap of distance "e" between them, so that the two hub pieces 4, 6 can rotate with respect to one another. The first and second hub pieces 4, 6 each have in their respective sides 45, 65 that face the gap, features that serve to prevent grease leakage due to centrifugal force. FIGS. 4A and 4B show two versions of coupling ends 45, 65 of hub pieces 4 and 6. In the embodiment shown in FIG. 4A, the end 45 of one of the pieces has a transverse section in an L shape, and the other end piece 65 has a cross section shaped like an inverted L, so that the two ends fit together. This configuration provides a labrynthine geometry, helping to reduce grease leakage. In FIG. 4B, the edge 45 of the first hub piece is slanted at an acute angle and the edge 65 of the other hub piece is also slanted, forming an obtuse angle with the inner surface complementary to the angle of the edge 45 first piece so that the two ends also fit. In any of the embodiments of the invention, a seal for sealing may be further disposed between the two hub pieces 4, 6 of the axle hub.

FIG. 4C shows an embodiment of the invention wherein a retainer 70 is arranged in the space between the hub pieces 4, 6. The retainer 70 works as a seal preventing leakage of lubricant through this space, rendering the free-wheel system tighter. In the second embodiment shown in FIG. 4C, the retainer shows a T-shape cross-section wherein the vertical member is set in the space between the first and the second hub pieces 4, 6 and the horizontal member extends over the external race of the first and the second hub pieces 4, 6 circumferentially sealing ail the space between the hub pieces. The retainer may be made, e.g., of Teflon or another suitable material to exert function of sealing. If the retainer 70 is applied to an embodiment of the invention that uses the fail-safe system as described above, it will preferably be made of a material that, if compressed, does not prevent the locking between the first and the second hub pieces 4, 6. The second hub piece 6 also has a radial wall 64 that extends radially outwardly toward the inner race of the pulley 2, in the space formed between the torsion spring 3 and the bearing 8. The second hub piece 6 also has a stop (not shown) on its axial face, against which runs into the second end of the torsion spring 3 when the pulley 2 rotates. By means of the coupling between the torsion spring 3 and the stop, there is torque transmission from the torsion spring 3 to the second hub piece 6, which integrates the free wheel system of the decoupler, and which transmits torque to the shaft 7, thereby causing rotational movement of the shaft 7. As explained previously, the torque applied to the torsion spring 3 is derived from the rotary movement of the pulley 2 and its coupling with the first end of the torsion spring 3.

The rotary motion of the huh pieces 6, 4 cause frictional engagement of the clutch spring 5 with the inner races of the hub pieces 6, 4, thereby transmitting torque to the axle 7 in the same direction of rotation with the axle huh 30 and pulley, or by allowing decoupling between the shaft and the pulley. In the decoupled condition between the shaft and pulley, the decoupler operates as a free wheel system, allowing the shaft 7 to rotate in a different direction from axle hub 30 and pulley 2, or by allowing the shaft 7 to rotate in the same direction but at a different, higher speed than the pulley (overrunning).

The shaft 7 drivable by the pulley 2 already described herein has an first end region 71 of larger outer diameter, which is mounted by press fitting or by other appropriate means, onto the smaller internal diameter portion 41 of the first hub piece 4. The shaft 7 has also a second end region 73 of larger external diameter, on which one of the bearing elements, preferably bearing 8, is mounted. In this embodiment of the invention, the bearing is set in the axle end opposed to the coupling with the alternator. The central portion 72 of the shaft 7 has a smaller outer diameter than the first and second end region 71, 73 and corresponds to the location of the clutch spring 5. Thus, the central region defines, together with the cavities formed in the first hub piece 4 and the second hub piece 6, a housing for the clutch spring 5. In the embodiment of the invention in which the decoupler is used to drive an alternator, the shaft 7 has an internal thread at one end for attachment to the alternator shaft, and a splined profile on its internal surface opposite the threaded end so that the assembly can be affixed to the alternator pulley using a special tool.

In a preferred embodiment of the invention, the decoupler further includes a washer 11 which is attached at one end to provide sealing against leakage of grease, prevent external contamination and provide a better finish for the assembly.

FIGS. 1B, 2B and 11B illustrate an alternative second embodiment of the invention. In this embodiment, the bearing 8 is mounted on the axle side near to the end for coupling with the alternator, while the bushing 1 is used as bearing element on the side opposed to the coupling with the alternator. This invertion of the bearing elements relative to the embodiment shown in FIGS. 1A, 2A and 11A may be advantageous depending on the side of the shaft 7 in which the greater load is applied, once the bearing 8 may withstand higher loads, thus being preferably positioned in the critical section of the pulley. A flange 50 is also mounted on the shaft end 7, next to the bearing 8, with structural means and/or in order to protect the said bearing.

In this embodiment of the invention, the pulley 2 presents a simplified internal geometry, with inner diameter provided only of small variations and without a portion of greater thickness. A bearing ring 80 is used as auxiliary bearing element, being coupled on the shaft and pulley side opposed to the side where the bearing 8 is coupled. The bearing ring 80 is mounted with interference fit to the pulley inner race. A bushing 1 is mounted between the first hub piece 4 and the bearing ring 80, making an interference fit on the bearing ring 80, and being able to rotate relative to the hub piece 4. The bushing 1 is responsible by journaling and centering between the shaft 7, the hub first piece 4 and the pulley 2, and also allows rotational movements between the pulley 2 and the shaft 7. The first shaft piece 4 is coupled rotation proof to the shaft 7.

According this second embodiment of the invention, instead of being formed in the pulley 2 inner race, the stopper that hits and transfers rotational torsion to the first torsion spring end 3 may, alternatively, be formed on the bearing ring 80. As the bearing ring 80 is torsion-proof coupled to the pulley 2 inner race, the pulley 2 rotational movement also causes a rotation in the bearing ring 80, that transfers this movements to the torsion spring 3. In this embodiment of the invention, the positions of the first hub piece 4 and the second hub piece 6 are inverted to each other relative to the embodiment shown in the FIGS. 1A, 2A e 11A. The first hub piece 4 is arranged next to the coupling side of shaft 7 with the alternator. This modifications do not interfere the functioning of the decoupler according the invention, being the same herein described before for the embodiments shown in FIGS. 1A, 2A e 11A.

The modifications shown in FIGS. 1B, 2B e 11B prove the flexibility of assembling the decoupler pieces according to the invention. The flexibility allows the piece assembly to be adjusted due to the placement of the pulley which applies the greater load on the decoupler.

Further, the use of a pulley of more simple internal geometry associated to a bearing ring 80 brings the advantage of making the pulley manufacturing process easier. The internal components assembly is also easier with this pulley geometry modification, as it makes it easier to arrange the pieces in its inferior.

The internal arrangement of the decoupler pieces, according de invention, also allows reduction of the torsional vibration amplitude by means of setting the torsion spring 3 inside its housing cavity 31. FIG. 12 schematically shows how this technical effect occurs in the embodiment of the invention shown in FIGS. 1B, 2B e 11B, this effect also being achieved in an equivalent way in the embodiments of the invention shown in FIGS. 1A, 2A, 11A.

In order to archive this technical effect, it is necessary that the free length of torsion spring 10 while relaxed be greater than the axial length L1 of the spring housing cavity 31. In this embodiment of the invention, the housing cavity 31 is limited in the axial direction by the bearing ring 80 and by the radial wall 64 of the second hub piece 6.

Thus, when the spring is set inside the cavity 31 is exerts a force F1 in the axial direction on the internal surface of the radial wall 64 of the second hub piece 6. Due to the force F1, the external surface of the radial wall 64 of the second hub piece 6 engages with a bearing element internal face placed at that side of the pulley, in this case, the bearing 8. If the pulley has a portion with reduced internal diameter 24 in the coupling with bearing 8 region, then the second hub piece 6 push by the torsion spring 3 also engages a shoulder 28 formed in the pulley internal race 2 in this reduced diameter portion 24.

As result of the torsion spring 3 compression over the second hub piece 6 with force F1, when a rotation of the second huh piece 6 relative to the pulley occurs, a friction force $F_{at}$ is generated in the radial wall 64 contact region of the second hub piece 6 with the hearing 8 and with a shoulder 28 of the pulley internal race 2. This friction force can be set by adjusting the compression of torsion spring 3 inside the housing cavity 31. The energy dissipation of the decoupler by means of this friction force $F_{at}$ contributes for the reduction of torsional vibrations of the decoupler.

The decoupler according to the invention has a fail-safe system, illustrated in FIGS. 5 to 10, that allows the decouple to continue to operate for a certain time interval, upon failure or breakage of the torsion spring or clutch spring. This system comes into operation when the torsion spring or the clutch spring is subjected to sufficient excessive stress to cause breakage of either spring.

According to this embodiment of the invention, the decoupler has a stop washer 9 disposed between the radial wall 64 of the second hub piece 6 and the bearing 8 and which extends in the radial direction toward the pulley 2. The washer is press fit on the shaft 7, preferably in the central region 72 of smaller outer diameter, as can be seen in FIGS. 5 and 6.

The washer 9 comprises a circular shape with flat sides and a thickness "e". The washer also has a shoulder 91 in a portion of the face that is in contact with the radial wall 64 of the second hub piece 6. FIG. 9 shows the geometry of the face of washer 9 in contact with the radial wall 64, and the shoulder 91 in accordance with a preferred embodiment of the invention. In this design, the washer has a raised portion in one quadrant of its surface, constituting shoulder 91. The elevation has a thickness "e" in relation to the rest of its surface, and corresponds to an angular region of 90°. This thickness "e" has the same value as the gap between the first and second hub pieces 4, 6. In the region of the shoulder 91, the washer 9 has a thickness of "2e" which can be better seen in FIGS. 7A and 7B.

The wall 64 of the second hub piece 6 also has a circular shape with flat sides, a thickness "e", and a ledge on one radial face that is in contact with the washer 9. FIG. 8 shows the geometry of the face of the radial wall 64 of the second hub piece 6 which makes contact with the washer, and the cam arrangement 101 in accordance with a preferred embodiment of the invention. FIG. 8 shows that the wall 64 is formed with a raised portion corresponding to ¼ of its surface, forming a shoulder 101. The shoulder 101 has a thickness "e" in relation to the rest of its surface, and corresponds to an angular region of 90°. Therefore, in the region of the shoulder 101, the wall 64 has a thickness of "2e" which also can be better seen in FIGS. 7A and 7B.

In this embodiment of the invention, the shoulders 91 and 101 of the washer 9 and wall 64 represent one quadrant of each of the respective circular surfaces, however, in other embodiments of the invention, these cams can take on other sizes, just so they enable the two pieces to be placed adjacent to each other without the shoulders overlapping.

In normal operation, the washer 9 and the second hub piece 6 are aligned such that the shoulder 91 of the washer 9 is rotated so as not to line up with the shoulder 101 of the wall 64 of the second hub piece 6. That is, the shoulder 91 of the washer 9 lines up with the recessed region in wall 64 of the second hub piece 6, while the shoulder 101 of the wall 64 of the second hub piece 6 is lined up with the recessed region of washer 9, as can be seen in FIGS. 5 and 7A. Thus, the total axial length of the two parts, washer 9 and the second hub piece 6, has a total thickness "3e" as shown in FIG. 5. In this arrangement and during normal operation of the decoupler, the second hub piece 6 and the first hub piece 4 are disposed with the gap spacing "e" between them, and can rotate freely relative to one another, as can also be seen in FIG. 5.

However, in the event of an overload applied to the torsion spring and consequently the second piece hub 6, these parts are induced to rotate more than the torsion spring 3 would allow, or more than 270°, causing the shoulder 101 of the wall 64 of the second hub piece 6 to line up with the shoulder 91, as shown in FIGS. 6 and 7B. In this case, the decoupler will operate in the fail-safe mode and the assembly of washer 9 and the wall 64 of the second hub piece will have a total thickness of "4e". In this arrangement, the second hub piece 6 is pushed back by a distance "e", thus eliminating the clearance between the second hub piece 6 and the first hub piece 4 as shown in FIG. 6. Consequently, the second hub piece 6 and the first hub piece 4 are forced into contact with each other, thus causing the first and second hub pieces 4, 6 to lock together, and therefore to axle 7 which is solidly connected to the first hub piece 4. In this case, the decoupler temporarily operates as a solid pulley, transferring rotational movement to the axle 7, until it can be replaced. In applications in which the decoupler is used in a motor vehicle, the rigid decoupler pulley continues to function, allowing the alternator to continue being loaded, preventing the vehicle from stopping because of discharge of the battery.

The fail-safe system of the present invention should also provide lock up between the second hub piece 6 and the pulley 2, so that the decoupler may operate as a rigid pulley in case of failure or breakage of the torsion spring 3. For this purpose, the inner race of the pulley 2 has a recess 26 in the region between the cavity 31 of the torsion spring and the bearing 8 within which are located washer 9 and the wall 64 of the second hub piece 6, as can be seen in FIG. 10A. When the washer 9 and the wall 64 of the second hub piece 6 are positioned in the normal operating mode, with a total thickness "3e", the second hub piece 6 can freely rotate within the recess 26. However, when the decoupler operates in the fail-safe mode, the washer 9 and the wall 64 of the second hub piece 6 are engaged because of the overlap between the shoulders 91 and 101, with a total thickness of "4e", and lock up occurs with the second hub piece 6 in the recess 26 as shown in FIG. 10B, so that the second hub piece 6 cannot rotate relative to the pulley 2. Whereas in this fail-safe mode, the shaft 7 is locked relative to the first hub piece 4, and the second hub piece 6 is locked with respect to the pulley 2, then the shaft 7 also becomes locked with respect to the pulley 2, effectively making the pulley rigid.

According to a preferred embodiment of the invention, to enable such locking from the second hub piece 6 and the pulley 2, the recess 26 has an internal stop (not shown) which runs into or interferes with the wall 64 of the second hub piece 6, locking it rotationally only when the shoulder 91 of the washer 9 overlaps the shoulder 101 of the second hub piece 6, and the washer 9 and the wall 64 of the second hub piece 6 assume a total thickness of "4e".

The fail-safe system described herein may be used in any type decoupler with free wheel system, simply by including a pulley 2, engaging a shaft 7, hub pieces 30 coupled between inner race of the pulley 2 and the outer surface of shaft 7 having a first hub piece 4 that is rotationally locked on the shaft 7 and a second hub piece 6 mounted around the shaft 7 and can rotate relatively to it, and having a radial wall 64 extending outward to the inner race of the pulley 2. The first and second hub pieces 4, 6 should be arranged with a gap between them. The decoupler also must possess at least one journal element between the shaft 7 and the pulley 2, and a spring friction clutch 5 attachable to the hub pieces 30 for transmission of torque to the shaft 7.

In addition to these essential characteristics, the decoupler fail-safe system according to the invention should comprise the washer 9 press fit onto the shaft 7 and extending radially within the pulley 2, contacting with a face of the wall 64 of the second hub piece 6. The washer 9 must have a shoulder 91 on its face in contact with the wall 64, and the wall 64 must have a shoulder 101 at its face in contact with the washer 9. Normally, the washer 9 and wall 64 will be positioned with the shoulder 91 of washer 9 rotated so that it fits into the recess of wall 64. When an overload is applied to the second hub piece 6, the shoulder 91 of the washer 9 overlaps the shoulder 101 of the wall 64, so that the second hub piece 6 is shifted axially toward the first hub piece 4, and the first and second hub pieces 4, 6 are locked by contact between them.

In a preferred embodiment this decoupler with fail-safe system, the shoulder 91 of the washer 9 and the shoulder 101 of wall 64 will each have a thickness "e" equal to the gap between the second hub piece 6 and the first hub piece 4. Additionally, the inner race of the pulley 2 has a recess 26 in the region of contact with the wall 64 of the second hub piece 6 and washer 9, the recess having an internal stop, which can contact the radial wall 64, the second hub piece 6 preventing rotation relative to the pulley 2, only when the shoulder 91 rotates to overlap the shoulder 101.

The construction and parts of the decoupler in accordance with the invention also allow the same decoupler to be used independently as either a decoupler with free wheel system, such as one-way clutch "OWC". When the decoupler is used in its full configuration with the torsion spring 3 and clutch spring 5, it operates as an over-running decoupler system described herein. However, it can be adapted to the simpler operating mode one way clutch illustrated in FIGS. 11A and 11B by simply removing the torsion spring 3 and adding the locking means between the second hub piece 6 and the pulley 2, which allows the transmission of torque between the pulley 2 and the second hub piece 6 when the hub piece rotates in one direction.

In a preferred embodiment of the invention, to lock between the pulley 2 and the second hub piece 6, an internal stop is formed on the inner race of the pulley 2, which can contact the radial wall 64 of the second hub piece 6 allowing the transmission of torque to the second hub piece 6 when the pulley 2 rotates in one direction.

The decoupler, according the invention, also presents the advantage of sparing an additional component or system acting as torque limiter to avoid that an excessive torque causes the torsion spring to fail, unlike the couplers of the state of art.

In the decoupler of the present invention, the torsion spring is arranged between the axle hub and the pulley internal race, in a housing region, so that the spring fits to the pulley maximum internal diameter when it expands. Thus, the pulley maximum internal diameter limits (or avoids) an excessive expansion of the torsion spring, during the apply of an eventually excessive torque that may cause the spring to break. So, no additional component or system is necessary for torque limiting and for avoiding spring breakage, as the pulley structure itself, associated with the spring placement, already provides this effect.

This arrangement of the torsion spring in a housing between the axle hub and the pulley inner race also provides an additional advantage of allowing the torsion spring to have a greater diameter for the same pulley encapsulation.

Having described an example of preferred embodiment of the invention it should be understood that the scope of the present invention encompasses other possible variations, being limited solely by the terms of the appended claims, including therein ail possible equivalents.

The invention claimed is:
1. A decoupler with free wheel system and vibration dampening comprising:
a pulley,
a shaft actuated by the pulley, a hub having a first hub piece and a second hub piece, the hub being coupled between an inner race of the pulley and an outer surface of the shaft, at least one journal element between the shaft and the pulley, a clutch spring, a torsion spring, and a torsional spring housing cavity formed by an inner surface of said pulley and an outer surface of said hub, with one of the axial sides of the torsional spring housing cavity being limited by the second hub piece, wherein an axial length of the torsional spring housing cavity is smaller than an axial length of the relaxed, unconstrained torsional spring, wherein the first hub piece is mounted to the shaft and the second hub piece is mounted around the shaft and can rotate relative to the shaft, the torsion spring is arranged inside said torsional spring housing cavity and has a first end operatively coupled to the pulley and a second end operatively coupled to the second hub piece, and the clutch spring is arranged internally to the torsion spring and is frictionally coupled to both the hub pieces for transmission of torque to the shaft, wherein the torsion spring arranged inside the torsional spring housing cavity exerts an axial force (F1) on the second hub piece, and the second hub piece exerts a friction force (Fat) on at least the journal element, in case of rotation of the second hub piece relatively to the pulley, providing a dampening effect to said decoupler, and a bearing ring coupled to the inner race of the pulley and a bushing mounted between the first hub piece and the bearing ring, the bearing ring having a stopper that engages the first end of the torsion spring, in case of a relative movement of the pulley and the torsion spring being arranged inside the torsional spring housing cavity which is limited in the axial direction by the bearing ring and by the second hub piece.

2. The decoupler according to claim 1, wherein the second hub piece has a radial wall extending radially to the inner race of the pulley, and the first and second hub pieces are disposed with a gap between them.

3. The decoupler according to claim 1, wherein the clutch spring is disposed between the outer surface of the shaft and inner races of the hub pieces and frictionally engaged with the inner races of the hub pieces.

4. The decoupler according to claim 1, wherein the clutch spring is disposed between an outer race of the hub and an inner surface of the torsion spring frictionally engaged with outer races of the hub pieces.

5. The decoupler according to claim 1, wherein at least a journal element is coupled between the pulley and the shaft allowing relative rotational movement between the pulley and shaft.

6. The decoupler according to claim 1, wherein at least a journal element comprises at least one of a bearing, a bushing and bearing ring.

7. The decoupler according to claim 1, wherein:

the second hub piece has a portion of larger internal diameter and a portion of smaller internal diameter, forming a cavity between the portion of larger internal diameter and the portion of smaller internal diameter, and the first hub piece has a portion with a smaller internal diameter which is mounted by interference fit on the shaft and a portion with a larger inner diameter, forming a cavity between the portion with a smaller internal diameter and with a larger inner diameter portion, the cavity formed in the second hub part is disposed contiguously with the cavity formed in the first hub piece, and the clutch spring is housed inside the cavities of the second hub piece and the first hub piece.

8. A decoupler with free wheel system and vibration dampening comprising:

a pulley, a shaft actuated by the pulley, a hub having a first hub piece and a second hub piece, the hub being coupled between an inner race of the pulley and an outer surface of the shaft, at least one journal element between the shaft and the pulley, a clutch spring, a torsion spring, and a torsional spring housing cavity formed by an inner surface of said pulley and an outer surface of said hub, with one of the axial sides of the torsional spring housing cavity being limited by the second hub piece, wherein an axial length of the torsional spring housing cavity is smaller than an axial length of the relaxed, unconstrained torsional spring, wherein the first hub piece is mounted to the shaft and the second hub piece is mounted around the shaft and can rotate relative to the shaft, the torsion spring is arranged inside said torsional spring housing cavity and has a first end operatively coupled to the pulley and a second end operatively coupled to the second hub piece, and the clutch spring is arranged internally to the torsion spring and is frictionally coupled to both the hub pieces for transmission of torque to the shaft, wherein the torsion spring arranged inside the torsional spring housing cavity exerts an axial force (F1) on the second hub piece, and the second hub piece exerts a friction force (Fat) on at least the journal element, in case of rotation of the second hub piece relatively to the pulley, providing a dampening effect to said decoupler, the second hub piece has a portion of larger internal diameter and a portion of smaller internal diameter, forming a cavity between the portion of larger internal diameter and the portion of smaller internal diameter, the first hub piece has a portion with a smaller internal diameter which is mounted by interference fit on the shaft and a portion with a larger inner diameter, forming a cavity between the portion with a smaller internal diameter and with a larger inner diameter portion, the cavity formed in the second hub part is disposed contiguously with the cavity formed in the first hub piece, and the clutch spring is housed inside the cavities of the second hub piece and the first hub piece.

9. The decoupler according to claim 8, wherein the second hub piece has a radial wall extending radially to the inner race of the pulley, and the first and second hub pieces are disposed with a gap between them.

10. The decoupler according to claim 8, wherein the clutch spring is disposed between the outer surface of the shaft and inner races of the hub pieces and frictionally engaged with the inner races of the hub pieces.

11. The decoupler according to claim 8, wherein the clutch spring is disposed between an outer race of the hub and an inner surface of the torsion spring frictionally engaged with outer races of the hub pieces.

12. The decoupler according to claim 8, wherein at least a journal element is coupled between the pulley and the shaft allowing relative rotational movement between the pulley and shaft.

13. The decoupler according to claim 8, wherein at least a journal element comprises at least one of a bearing, a bushing and bearing ring.

14. The decoupler according to claim 8, wherein a bearing ring coupled to the inner race of the pulley and a bushing mounted between the first hub piece and the bearing ring, the bearing ring having a stopper that engages the first end of the torsion spring, in case of a relative movement of the pulley and the torsion spring being arranged inside the torsional spring housing cavity which is limited in the axial direction by the bearing ring and by the second hub piece.

* * * * *